(12) United States Patent
Chandra et al.

(10) Patent No.: US 9,076,323 B2
(45) Date of Patent: Jul. 7, 2015

(54) METHOD AND SYSTEM FOR INTERFACING WITH MULTIPLE DEVICES

(71) Applicant: HEWLETT-PACKARD DEVELOPMENT COMPANY, L.P., Houston, TX (US)

(72) Inventors: Praphul Chandra, Bangalore (IN); Siva Prasad Katru, Bangalore (IN); Raghavan Parthasarathy Sreenivasa, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 327 days.

(21) Appl. No.: 13/631,152

(22) Filed: Sep. 28, 2012

(65) Prior Publication Data

US 2013/0082826 A1    Apr. 4, 2013

(30) Foreign Application Priority Data

Sep. 29, 2011   (IN) .......................... 3387/CHE/2011

(51) Int. Cl.
*G08B 21/00* (2006.01)
*G08C 17/00* (2006.01)
*H04L 12/28* (2006.01)

(52) U.S. Cl.
CPC ............ *G08C 17/00* (2013.01); *H04L 12/2814* (2013.01); *H04L 12/282* (2013.01); *G08C 2201/32* (2013.01); *G08C 2201/42* (2013.01)

(58) Field of Classification Search
CPC .......................... H04L 12/282; G08C 2201/20
USPC .............. 340/4.11, 12.22, 12.23, 12.5, 12.52, 340/12.53, 426.13; 341/176; 348/734
See application file for complete search history.

(56) References Cited

U.S. PATENT DOCUMENTS

| | | | |
|---|---|---|---|
| 7,209,980 B2 | 4/2007 | Wugofski et al. | |
| 2005/0157217 A1* | 7/2005 | Hendricks | ...................... 348/734 |
| 2006/0143327 A1 | 6/2006 | Hsieh et al. | |
| 2006/0152401 A1* | 7/2006 | Spilo | .............................. 341/176 |
| 2010/0283916 A1* | 11/2010 | Yen et al. | ...................... 348/734 |

OTHER PUBLICATIONS

Nichols, Jeffrey, Automatically Generating User Interfaces for Appliances, 2004. < http://www.cs.cmu.edu/~jeffreyn/papers/doccon_paper.pdf >.

* cited by examiner

*Primary Examiner* — Mark Rushing
(74) *Attorney, Agent, or Firm* — Mannava & Kang, P.C.

(57) ABSTRACT

Provided is a method of interfacing with a plurality of devices. A user command is received by a computing system. The computing system identifies a device, amongst a plurality of devices, to implement the user command. The user command is transmitted to the identified device through a remote control unit and implemented in the identified device.

15 Claims, 3 Drawing Sheets

METHOD AND SYSTEM FOR INTERFACING WITH MULTIPLE DEVICES

The present application claims priority under 35 U.S.C 119 (a)-(d) to Indian Patent application number 3387/CHE/2011, filed on Sep. 29, 2011, which is incorporated by reference in its entirety.

BACKGROUND

It is common to find presence of multiple devices, especially those playing different types of media, in a typical household. For example, there might be a television set (TV), a radio, a compact disc (CD) player, a cassette player, a digital versatile disc (DVD) player, a MP3 player, a music system, a set-top box, a Blu-ray player, or a combination of any of the aforesaid players. Typically, each media device has its own user interface which is distinct from other media devices. Also, each device might have a unique controller (for instance, a remote controller) for manipulating its various functions. In order to operate these devices properly, a user is expected to learn and understand multiple user interfaces and several controller operations. Needless to say this might require a learning curve which can intimidate even savviest of users not to mention a lay user, who could become completely confused.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Improvements in technology over the years have led to a variety of media formats (for example, .mp3, .mpeg, etc.), media storage units (for example, CD, DVD, audio cassette) and media players (for example, TV, CD player, DVD player, etc.). A natural corollary of this advancement is the increase in the number of media devices in a typical household. It is usual to find a television set (TV), a radio, a compact disc (CD) player, a digital versatile disc (DVD) player, a music theatre system, a set-top box, or a combination of any of the aforesaid media playing devices in a home.

Each media device typically has its own proprietary user interface. A user is expected to learn the interface in order to operate the device correctly. In some cases the interface is part of the device itself, but in other instances a remote controller is also provided that acts as an intermediary between the user and the device interface. In both situations, in case multiple devices are present, a user is required to learn interaction features of each device separately. Needless to say, this may put a lot of cognitive load on a user, which is not desirable.

Embodiments of the present solution provide a method and system for interfacing with a set of multiple devices through a simplified mechanism. The method considers a group of devices in an environment (for instance, a home or an office) as an "ecosystem" and allows a user to interact with this "ecosystem" using a single interface, without requiring the user to learn functions of each device separately. A user is able to interface with multiple media devices through a single input device such as a remote controller.

Figure 1:
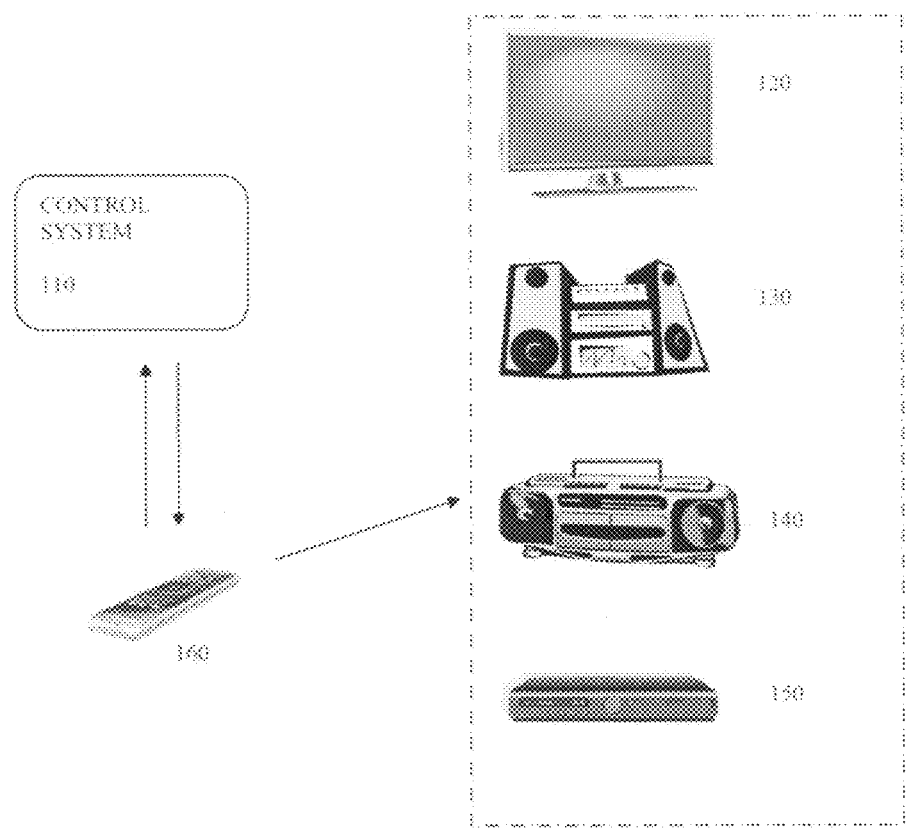
FIG. 1 illustrates a representative environment for implementing a system for interfacing with multiple devices, according to an embodiment.

FIG. 1 illustrates a representative environment for implementing a system for interfacing with multiple devices, according to an embodiment. In an example, the representative environment could be a user's home. But, in other non-limiting examples, it could be an office, a library, an educational institute, or any other dwelling. As shown in FIG. 1, the representative environment 100 includes a control system (or host device) 110 and a plurality of media devices 120, 130, 140, 150. In an example, the media devices 120, 130, 140, 150 may include, for instance, a television set 120, a home theatre system 130, a cassette player 140 and a compact disc (CD) player 150. These examples of media playing devices are for the purpose of illustration only and not by way of limitation. The other media playing devices may include a DVD player, a radio, a set-top box, a blue-ray player, a digital video recorder (DVR), and the like. Each of the media devices 120, 130, 140, 150 includes means for communication via a wireless technology, such as infrared, Bluetooth, Wi-Fi and/or ZigBee. The representative environment 100 also includes a remote control unit (remote controller) 160.

The control system 110 (described in detail below and illustrated in FIG. 2), media devices 120, 130, 140, 150 and remote control unit 160 may include wireless communication means such as, but not limited, infrared, Bluetooth, Wi-Fi and radio frequency (RE) protocols. The control system 110, remote control unit 160 and media devices 120, 130, 140, 150, may communicate with each other through either of the aforesaid wireless Communication means. In another example, in some situations, the wireless communication between two or more devices may be replaced with wired communication, for instance through a co-axial cable, and the like. Therefore, both wired and wireless communications means be used between the devices present in the representative environment 100 to communicate data and/or signals with each other.

The remote control unit 160 is configured to send, receive and relay commands (data and/or signals) to and from the control system 110 and media devices 120, 130, 140, 150. In the representative environment 100, the media devices 120, 130, 140 and 150 are grouped together or in spatial proximity of each other, and the remote control unit 160 is in "line of sight" of all media devices 120, 130, 140, 150. In another example, however, the remote control unit 160 may not necessarily be required to be "in line of sight" of all media devices.

In an example, the remote control unit 160 is a typical IR (infrared) based remote control device which can be used to issue commands from a distance to a device, such as media devices 120, 130, 140, 150. In other instances, however, the remote control unit 160 may include other wireless communication means, such as, Bluetooth (BT), WiFi, ZigBee, etc. The unit 160 may include an array of buttons for controlling various settings or parameters (for example, channel number, track number, volume, etc.) of media devices 120, 130, 140, 150. In the present case, the remote unit 160 also has a convertor module (hardware and/or machine executable instructions) which can covert a Bluetooth command (signal) into an IR command (signal) and vice versa. Similar convertors may be present in other instances for converting one wireless communication means or protocol to another. For example, there may be present a convertor for converting a Wi-Fi command into a ZigBee signal and vice versa.

Additionally, the term remote control unit may refer to include any interaction modality which is capable of command and control of the control system 110. Hence gestures (e.g. hand gestures) made by a user may be included in the definition of a remote control unit since the control system 110 is capable of capturing these gestures using cameras (RGB and/or Infrared) and then interpret them to certain commands.

Figure 2:
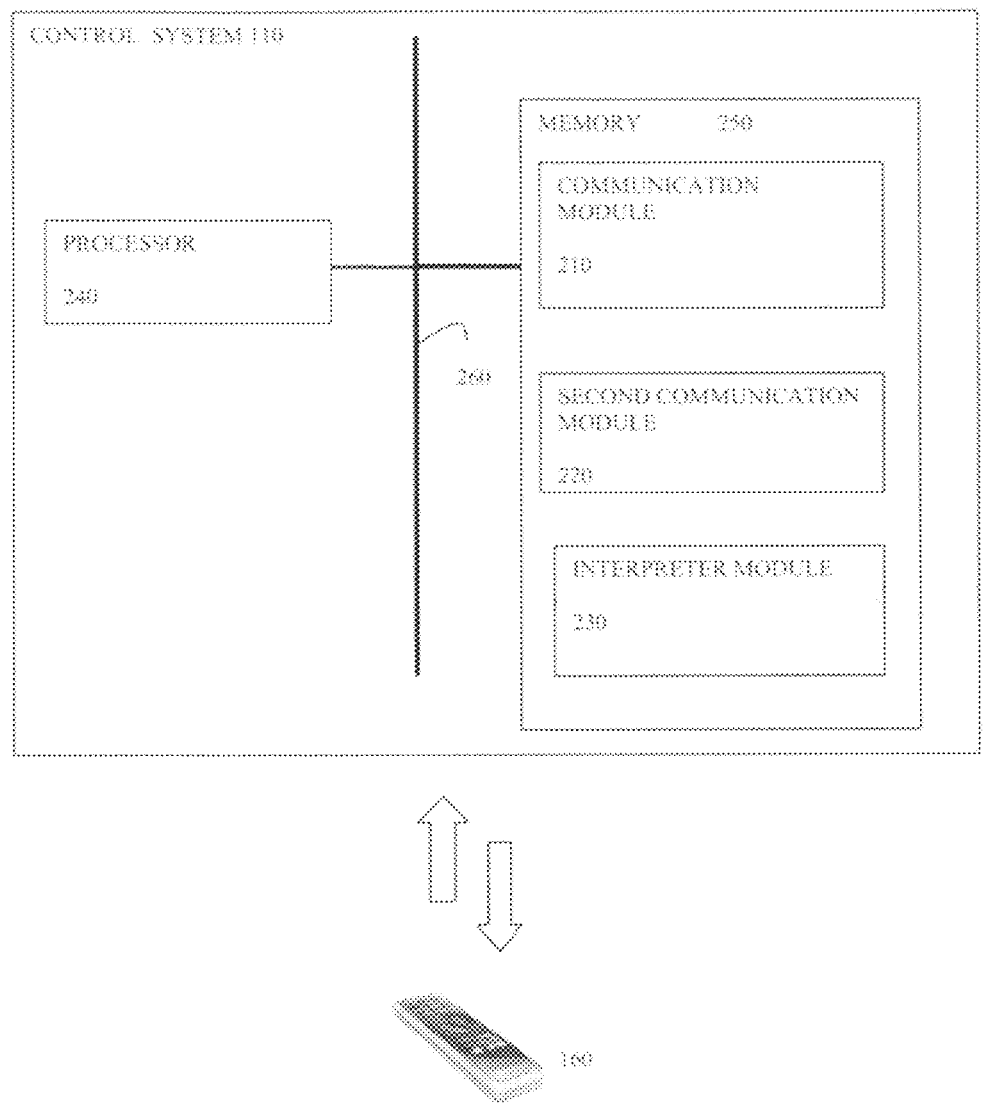
FIG. 2 shows a block diagram of a system of FIG. 1 for interfacing with multiple devices, according to an embodiment.

FIG. 2 shows a block diagram of a system of FIG. 1 for interfacing with multiple devices through a single interface, according to an embodiment.

Control system (host device) 110 includes a communication module 210 for receiving and transmitting wireless data (commands) and/or signals. In an example, the communication module 210 may be an infrared (IR) module for receiving (receiver) and transmitting (transmitter) an IR command. The control system 110 may include additional communication modules, such as a second communication module 220 and a third communication module (not shown in the FIG.). In an example, an additional communication module may be a Bluetooth module for receiving (receiver) and transmitting (transmitter) a Bluetooth command, a Wi-Fi module for receiving (receiver) and transmitting (transmitter) a WiFi command or a ZigBee module for receiving (receiver) and transmitting (transmitter) a ZigBee command. In other words, the control system can support multiple wireless communication means and protocols.

Control system 110 also includes an interpreter module 230. The interpreter module 230 is capable of identifying a command received from a device such as a remote control unit 160 of FIG. 1. During operation, a command received by a communication module 210 (for instance, an IR command from a remote control unit) is transferred to the interpreter module 230 for identification. To provide an example, if a "Volume UP" command is received by a communication module 210, it is routed to the interpreter module 230, which identifies it as an action to increase the volume of a device.

The interpreter module 230 is also responsible for identifying a device(s) to which a received command should be transferred for execution. It is the interpreter module 230 which determines, based on an analysis of a pre-defined condition(s), which are enumerated in detail below, to which device(s) the command should be sent for implementation. In an example, once the device(s) is/are identified, the interpreter module transmits the command to a remote control unit which then relays it to the identified device(s). The remote control unit may transmit the command in the wireless communication format it was received, or convert it to another format before transmission. For instance, if an IR command was received by the remote control unit, it may transfer it to the target device as an IR command, or it may convert it to another wireless communication format, such as Bluetooth, Wi-Fi or ZigBee, before transmission.

Control system 110 may include a processor 240, for executing machine readable instructions, and a memory (storage medium) 250, for storing machine readable instructions (such as, modules 210, 220, 230). In an example, the control system 110 may also include a display. These components may be coupled together through a system bus 260.

Processor 240 is arranged to execute machine readable instructions. The machine readable instructions may be in the form of modules 210, 220, 230 or an application for executing a number of processes. In an example, communication module 210, present in memory 250, receives a user command from a remote control unit. Upon receipt, processor 240 instructs an interpreter module 230, present in the memory 250, to identify a device amongst the plurality of devices, to implement the user command. The communication module 210 then transmits the user command to the identified device through the remote control unit, upon such identification.

It is clarified that the term "module", as used in this document, may mean to include a software component, a hardware component or a combination thereof. A module may include, by way of example, components, such as software components, processes, functions, attributes, procedures, drivers, firmware, data, databases, and data structures. The module may reside on a volatile or non-volatile storage medium and configured to interact with a processor of a computer system.

The memory 250 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. The memory 250 may include modules, such as, but not limited to, a communication module 210, a second communication module 220 and an interpreter module 230. The memory may also include a database for storing, for instance, status information of media devices and video recordings of user commands received from various remote control units.

Control system 110 may be a computing system, such as, but not limited to, a desktop computer, a notebook computer, a server computer, a personal digital assistant (PDA), a mobile device, a television (TV), a docking device, etc. It may be connected to a broadcast network and/or a computer network, such as, an intranet or the Internet (World Wide Web). Additionally, it may be a standalone device or integrated with another device, such as a media playing device (for example, TV, music player, disc player, computer system, etc.).

In an example, the control system 110 may include a camera for tracking and recording a user's movements, especially those related to providing a command to a media device via a remote control. The camera may be detachable or non-detachable from the control system.

It would be appreciated that the system components depicted in FIG. 2 are for the purpose of illustration only and the actual components may vary depending on the computing system and architecture deployed for implementation of the present solution. The various components described above may be hosted on a single computing system or multiple computer systems, including servers, connected together through suitable means.

Figure 3:
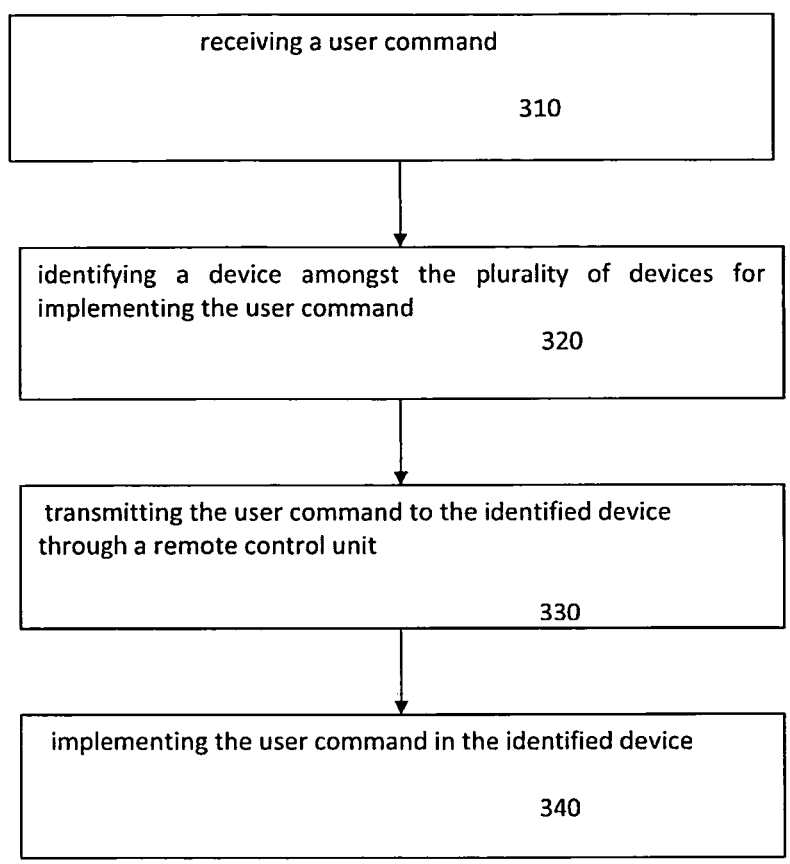
FIG. 3 shows a flow chart of a method for interfacing with multiple devices, according to an embodiment.

FIG. 3 shows a flow chart of a method for interfacing with multiple devices through, according to an embodiment.

The method may be implemented in an environment where multiple devices may be present in the vicinity of each other. For instance, a representative environment could be a user's home, office, place of education, etc. where multiple media devices, such as TV, radio, CD player, home theatre system, set-top box, etc. may be present together. The multiple devices may or may not be present in line of sight of each other.

Let's consider an example where multiple media devices, a TV, a CD player, a radio and a home theatre system are present in a user's home in the near vicinity of each other. It is assumed that one or more of these devices are turned on and ready for use. In this or similar context, block 310 involves receiving a user command from a remote control unit. The user command may be any command which could be implemented in either of the present media devices. For instance, it may relate to volume of a device ("VOL UP" or "VOL DOWN"), change in station ("CHANNEL UP" OR "CHANNEL DOWN"), control functions (PLAY, PAUSE, STOP, etc.) and so and so forth. The remote control unit may provide a user command in any of the known wireless communication technologies, such as, but not limited to, infrared, Bluetooth, Wi-Fi and ZigBee. It is assumed that the remote control unit has the means and functionality to support these wireless communications forms.

The user command is received by a control system (such as of FIG. 2), which may be a standalone device in the vicinity of media devices or an integrated unit, which may be a part of another media device, such as TV or a CD player. The control device, which could also be termed as the "host device", may receive a user command in either of the wireless communication technologies enumerated above. It has means (communication modules) to receive and transmit a communication command or signal in either or all of the above mentioned wireless communication protocols. For instance, it may include an IR receiver and transmitter to receive and transmit an infrared command respectively. Similarly, it may include a Bluetooth receiver and transmitter to receive and transmit a Bluetooth command respectively In block 320, the control system identifies a device amongst the multiple devices for implementing the user command. Once a user command is received by the control system it identifies the command (for instance, "VOL UP") and then proceeds to identify a device(s) amongst the plurality of media devices which could implement or execute the user command. The device identification by the control system may take place in a number of ways.

In an example, the control system identifies the state of media devices present in the environment. The state of a media device may relate to its active or non-active status. For instance, whether a device is switched-on (power on) or switched-off (power off)? In another instance, the state of a media device may relate to a functionality of the device. For example, "what's the status of the volume level of a device?", "what's the state of a contrast or color function of a device?", "which channel number is currently playing in a device", and so and so forth. The control system may obtain "state" of various media devices by communicating with them through a wireless communication technology, such as infrared, Bluetooth, Wi-Fi or ZigBee. It may store the state of these devices in a database in its memory (storage medium), which may be periodically updated based on device configuration or user configuration.

The control system uses the status information of media devices present in its vicinity or environment to determine to which device(s) the user command should be transmitted. For instance, if a user command is given to increase the volume, the control device may look up status of various devices from its memory to decide the implementing device. To elaborate, let's assume that the status of media devices in the control system's vicinity is as follows. (a) TV: ON, Volume level=5 (Minimum=1; Maximum=10); (b) CD player: OFF; (c) Radio: ON, Volume level=mute; and (d) Home theatre system: ON, Volume level=mute.

In the above scenario, the control system may decide a device(s) for implementing the user command to:
  a) any one of the media devices among the plurality of devices based on the relevant functionality of the media device and its availability: in the present case, the user command could be sent to either TV, radio or home theatre system, since all of these devices have an "ON" status and all of them have the available bandwidth to increase the volume (the TV volume could be increased up to maximum=10 level, and both radio and home theatre system are in "mute" status);
  b) two or more of the media devices among the plurality of devices based on the relevant functionality of the media device and its availability (i.e. two or more devices (from TV, radio and home theatre system) could be selected for implementation based on the logic enumerated in point (a) above); or
  c) all of these devices (TV, radio and home theatre system) among the plurality of devices based on the relevant functionality of the media device and its availability (i.e. all media devices (TV, radio and home theatre system) could be selected for implementation based on the logic enumerated in point (a) above); or
  d) those devices which are not eliminated by the control system based on an elimination system. In an example, the elimination system could be based on the active or non-active status of a device. In the present instance, of all the devices, the CD player's status=OFF, therefore, the control system would eliminate this device due its non-availability and may make a selection from the remaining devices based on other criteria.

In another example, the device identification by the control system may take place by evaluating the past (history) commands provided by a user, for instance in the recent past. The control system keeps track of commands received from a remote control unit. It records these commands in its memory. In future, if a user command is received it analyses the previous commands to identify a device(s) which is/are most suitable for implementing the user command. To provide an illustration, let's consider a scenario when previous user commands to increase the volume were forwarded (by the control system) for implementation in a TV set (i.e. a particular device amongst plurality of devices). At a later period, upon receipt of another volume increase command from the user, the control system analyses its records and determines that it has already forwarded enough commands to the TV set so as to already exhaust its bandwidth to increase volume any further. Based on this conclusion, it analyses the command history records for other devices to identify a device(s) that may be most ideal for further increasing the volume. The aforementioned instance is merely for the purpose of illustration and many more examples would be likely apparent.

In another example, the control system includes a camera (RGB and/or Infrared) which is capable of tracking user commands provided through remote control units of multiple devices or by tracking gestures made by a user. The camera tracks and records user commands provided to a plurality of devices from their own respective remote control units. The multiple devices need to be in line of sight of the control system for the camera to track them correctly. The recordings are saved in the memory of the control system, which may later use them to identify a suitable device for implementing a future user command. In other words, the identification of an implementing device(s) is based on an evaluation of past video recordings of user commands received from remote control units corresponding to the plurality of devices.

To provide an illustration, let's assume there is a plurality of devices (for instance, a TV, a DVD player and a radio) each with its own remote control as a user interface. In this context, the control system with a camera tracks user commands that are individually provided to each device through its respective remote control. For instance, if a "CHANNEL UP" command is given to the radio, it is recorded and saved by the control system. In another case, if a "CONTRAST CHANGE" command is provided to the TV system, the camera captures and stores it in the control system. Likewise other user commands are captured and recorded. The control system later evaluates this data to determine which device is most appropriate for implementing a future user command. For instance, if a subsequent user command is "CONTRAST CHANGE", it likely that the control system would determine that the command is forwarded to the TV system (since the past user command based on the analysis of recorded data was given to the TV set) although the DVD player was also capable of implementing a "CONTRAST CHANGE" command. The aforesaid instance is merely for the purpose of illustration and many more examples would be likely apparent.

Block 330 involves transmitting a user command to the identified device through the remote control unit. Once the control system identifies a device(s) for implementing a user command, the command is routed to the intended device(s) via the remote control unit, which originally sent the user command to the control system, for implementation or execution.

In an example, the control system transmits the command to the remote control unit in the same wireless communication protocol in which it was received. For instance, if the user command was received by the control in an infrared format, it may send a response back to the remote control unit in the form of an infrared signal. In another example, however, the control system converts the original user command format (wireless protocol) to another format based on its analysis of the capability of the implementing device. For instance, if an IR user command is received by the control system but it realizes that the implementing device has only Bluetooth capability, the control system may include a convertor to convert the original IR user command into a Bluetooth command before forwarding it to the remote control unit which relays it to the implementing device. In other words, a user command is converted to a new wireless communication format, different from that received by the remote control unit, prior to its transmission to the identified device. The new wireless communication format corresponds to wireless communication means (capabilities) of the identified device.

Block 340 involves implementing a user command in the identified device. The remote control device relays the user command to the identified device, which implements it. For instance, if the user command was to "CHANGE CHANNEL" and it was determined by the control system for implementation in a TV set, the remote control unit forwards it to the TV set, which executes it to implement a change in channel number.

It will be appreciated that the embodiments within the scope of the present solution may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A computer-implemented method of interfacing with a plurality of devices, comprising:
  receiving a user command in a computing system, wherein the computing system is to receive the user command from a remote control unit;
  identifying, by the computing system, a device, amongst the plurality of devices, for implementing the user command; and
  transmitting, by the computing system, the user command to the identified device through the remote control unit, wherein the remote control unit is to receive the user command from the computing system and to transmit the user command to the identified device.

2. The method according to claim 1, wherein the user command is received through the remote control unit or a gesture made by a user.

3. The method according to claim 1, wherein identifying a device, amongst the plurality of devices, for implementing the user command, includes determining a status of each of the plurality of devices, wherein the status of a device includes its power-on or power-off status and/or the status of a functionality associated with a device.

4. The method according to claim 3, wherein identifying a device further comprises identifying the device based on the determined status of each of the plurality of devices.

5. The method according to claim 3, wherein identifying a device further comprises identifying two or more of the plurality of the devices based on the determined status of each of the plurality of devices.

6. The method according to claim 3, wherein identifying a device further comprises identifying all of the plurality of devices based on the determined status of each of the plurality of devices.

7. The method according to claim 1, wherein identifying, by the computing system, a device, amongst the plurality of devices, for implementing the user command further comprises identifying the device based on an evaluation of past user commands received from the remote control unit.

8. The method according to claim 1, wherein identifying, by the computing system, a device, amongst the plurality of devices, for implementing the user command further comprises identifying the device based on an evaluation of past video recordings of user commands received from remote control units corresponding to the plurality of devices.

9. The method according to claim 1, further comprising converting the user command to a new wireless communication format prior to transmitting the user command to the remote control unit, wherein the new wireless communication format corresponds to a wireless communication format of the identified device.

10. A computing system for interfacing with a plurality of devices, comprising:
  a processor; and
  a memory on which is stored machine readable instructions to cause the processor to:
    receive a user command from an apparatus that is remote from the computing system;
    identify a device amongst the plurality of devices, to implement the user command; and
    transmit the user command to the identified device through a remote control unit, wherein the remote control unit is to receive the user command from the computing system and to transmit the user command to the identified device.

11. The system of claim 10, wherein to identify a device, amongst the plurality of devices, to implement the user command, the machine readable instructions are further to cause the processor to determine a status of each of the plurality of devices, wherein the status of a device includes its power-on or power-off status and/or status of a function associated with a device.

12. The system of claim 10, wherein to identify a device, amongst the plurality of devices, to implement the user command, the machine readable instructions are further to cause the processor to identify the device based on an evaluation of past user commands received from the remote control unit.

13. The system of claim 10, wherein to identify a device, amongst the plurality of devices, for implementing the user command, the machine readable instructions are further to cause the processor to identify the device based on an evaluation of past video recordings of user commands received from remote control units corresponding to the plurality of devices.

14. The system of claim 10, wherein the machine readable instructions are further to cause the processor to convert the user command to a new wireless communication format prior to transmitting the user command to the remote control unit, wherein the new wireless communication format corresponds to a wireless communication format of the identified device.

15. A non-transitory computer readable storage medium on which is stored machine readable instructions that when executed by a processor cause the processor to:

receive a user command in a computing system from an apparatus that is remote from the computing system;

identify a device, amongst a plurality of devices, to implement the user command; and transmit the user command to the identified device through a remote control unit, wherein the remote control unit is to receive the user command from the computing system and to transmit the user command to the identified device.

* * * * *